(No Model.)

J. R. PEARCE.
STEAM ENGINE.

No. 527,072. Patented Oct. 9, 1894.

Witnesses
Thos. E. Robertson
W. E. Clendaniel

Inventor
John R. Pearce
By T. J. W. Robertson
Attorney

UNITED STATES PATENT OFFICE.

JOHN R. PEARCE, OF AMORY, MISSISSIPPI.

STEAM-ENGINE.

SPECIFICATION forming part of Letters Patent No. 527,072, dated October 9, 1894.

Application filed March 14, 1894. Serial No. 503,613. (No model.)

*To all whom it may concern:*

Be it known that I, JOHN R. PEARCE, a citizen of the United States, residing at Amory, in the county of Monroe and State of Mississippi, have invented certain new and useful Improvements in Steam-Engines, of which the following is a specification, reference being had therein to the accompanying drawings.

This improvement is designed to provide an engine of the oscillating piston class, which may be used as an ordinary engine for operating machinery generally, but is more particularly designed for use as a bell ringer; and the invention consists in the peculiar construction, arrangement and combination of parts hereinafter more particularly described and then definitely claimed.

Figure 1:
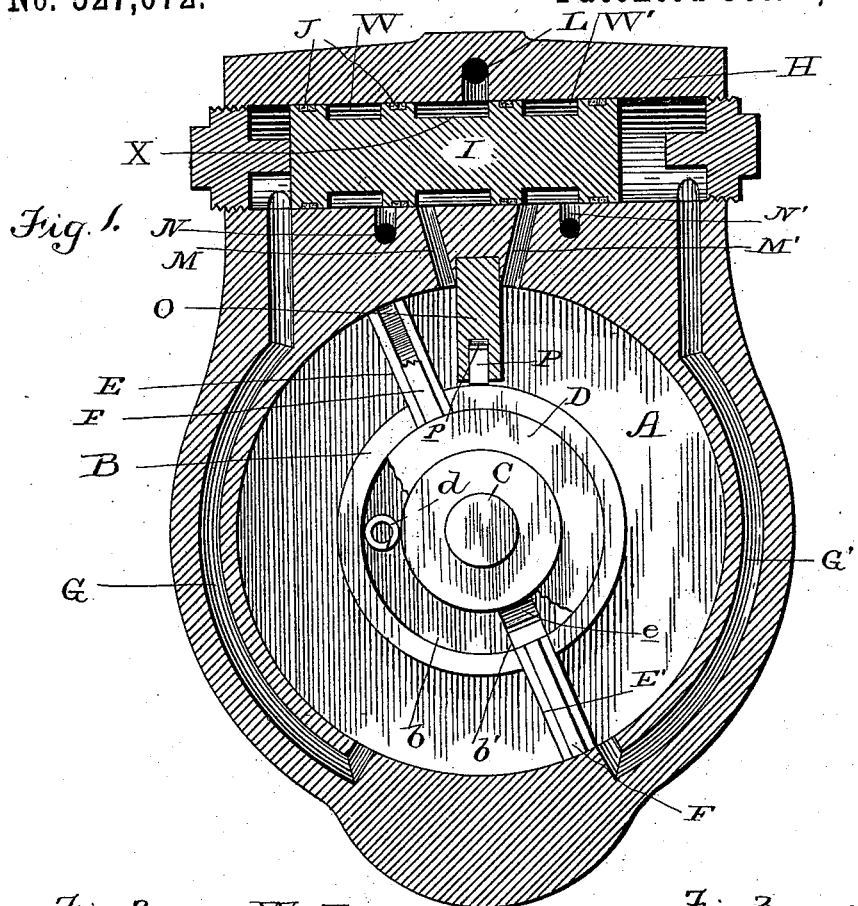
Figure 2:
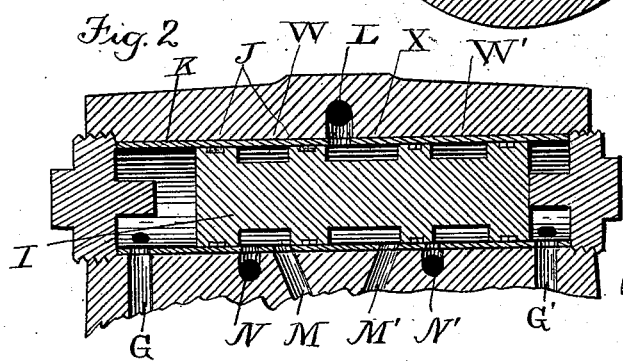
Figure 3:
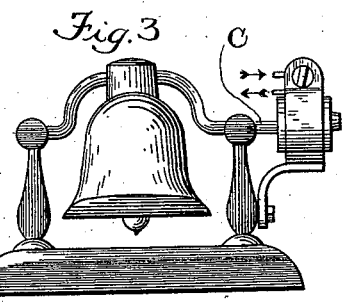
Figure 4:
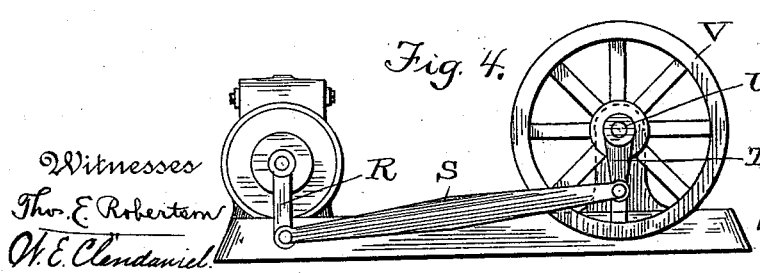

In the accompanying drawings—Figure 1 is a central, vertical section of an engine, constructed according to my improvement, but having some of the parts of the piston in elevation. Fig. 2 is a similar view of the valve in a different position. Fig. 3 shows the engine adapted for use as a bell ringer, and Fig. 4 shows it provided with an arm, pitman and fly wheel adapted for driving machinery, both of these last figures being on a smaller scale.

Referring now to the details of the drawings by letter—A represents the cylinder in which oscillates the piston B on the shaft C.

At D is shown a packing ring, fitting in a circular recess $b$ in the piston-head and is forced outward by spiral springs $d$. In recesses $b'$ are set the wings E E' which are forced outward by curved springs $e$ and in the face of the wings are set packing strips F, which are also forced out by similar springs.

In the metal forming the sides of the cylinder are shown two steam passages G G', which commence near the bottom of the cylinder and terminate in a valve-chest H, bored at right angles to the bore of the cylinder, and in which works a piston valve I, having suitable packing rings J. To prevent said packing rings dropping into the steam ports when in operation, I may use a perforated cylinder K, which incloses the entire piston valve, as shown in Fig. 2. An inlet to the steam-chest is shown at L, and M M' show the inlets from the steam-chest to the cylinder, while N N' indicate the exhaust. At the upper part of the cylinder, midway between the ports M M', is a fixed division O, having a packing strip P which is held in contact with the piston B by a spring $p$.

The piston valve has three annular grooves W, X, W', the central one being used to admit steam to the cylinder, while the grooves W, W' are used for exhausting the steam.

The operation of the engine is as follows: Steam being admitted into the steam-chest, it enters the cylinder through the port M (see Fig. 1) and acting on the wing E forces the piston round until it has passed the inlet to the passage G, when steam from that side of the cylinder passes through said passage into the left-hand side of the steam-chest and forces the valve over to the position shown in Fig. 2, thus shutting off steam from the port M, opening the exhaust through said port and the exhaust N and admitting steam to the other side of the cylinder through the port M', whereby the steam is then made to act on the wing E' and forces the piston in the other direction until it has passed the mouth of the passage G', when the steam passes up into the right-hand end of the steam-chest and the valve is moved in the opposite direction or into the position shown in Fig. 1, when the motion is continued as before.

If the engine is to be used as a bell ringer, the shaft C is continued so as to form the hanger for the bell, as shown in Fig. 3, but if it is to be used for any purpose where rotary motion is to be given, the shaft is provided with an oscillating arm R, which is connected by means of a pitman S with a crank T on a shaft U, on which is mounted a fly or belt wheel V, which is heavy enough to carry the crank T over the center, and thus rotary motion is imparted to the shaft U and fly-wheel V. By this construction a very simple engine is provided, that may not only be used as a bell ringer, but will also be found very useful for driving machinery. Some of its advantages are: cheapness in construction, great power, high speed, durability, simplicity, lightness and ease of operation.

What I claim as new is—

1. The combination in an engine, of a cylinder, a steam-chest, a piston valve therefor, an oscillating piston working in said cylinder, and ports near the bottom of said cylinder leading to the opposite ends of the steam-chest, substantially as described.

2. The combination in an engine, of a cylinder having a division O, a steam-chest, a piston valve therefor having grooves W, X, W', ports M, M' leading into the upper part of the cylinder, ports G, G' leading from the lower part of the cylinder, and exhaust ports N, N', and a piston B, having wings E, E, substantially as described.

3. The oscillating engine herein described, comprising the cylinder A, having division O, provided with packing strip P, steam passages G, G' formed in the sides of said cylinder, a piston B having packing ring D, and wings E E forced outward by springs, a steam-chest H having ports M, M', N, N', a piston valve working therein, having grooves W, X, W' and an inlet port L, all substantially as shown and described.

In testimony whereof I affix my signature, in presence of two witnesses, this 10th day of March, 1894.

JOHN R. PEARCE.

Witnesses:
   J. P. JOHNSTON,
   R. B. MARTIN.